Jan. 18, 1966   J. W. CHRISTOFF   3,229,644
RAILWAY CAR MOVING APPARATUS
Filed May 1, 1964

Inventor
James W. Christoff
By Stevens Davis Miller & Mosher
Attorneys

United States Patent Office 3,229,644
Patented Jan. 18, 1966

3,229,644
RAILWAY CAR MOVING APPARATUS
James W. Christoff, Minneapolis, Minn., assignor to Mannix International Inc., Minneapolis, Minn.
Filed May 1, 1964, Ser. No. 364,251
2 Claims. (Cl. 104—147)

This invention relates to improvements in apparatus for use on railroad tracks.

Various under-track and on-track devices and vehicles are now in common use in the servicing of railroad track. Such devices include under-track plows and sleds which remove clogged ballast from beneath a railroad track, replace it with fresh ballast and then level the same. In some equipment defective ties are also replaced. On-track vehicles are often used in association with such under-track devices.

Many of these pieces of track working equipment are not fitted with their own propulsion means and it is necessary to haul them along the track. The forces involved in dragging an under-track device or a track-elevating on-track vehicle along the track are considerable. It has been conventional in the past to employ a locomotive for this duty.

The present invention relates to a device adapted to replace a locomotive for this purpose.

One embodiment of a device constructed in accordance with the present invention is illustrated in the accompanying drawings. This device is shown by way of example, the broad scope of the invention being limited only by the appended claims.

Figure 1:
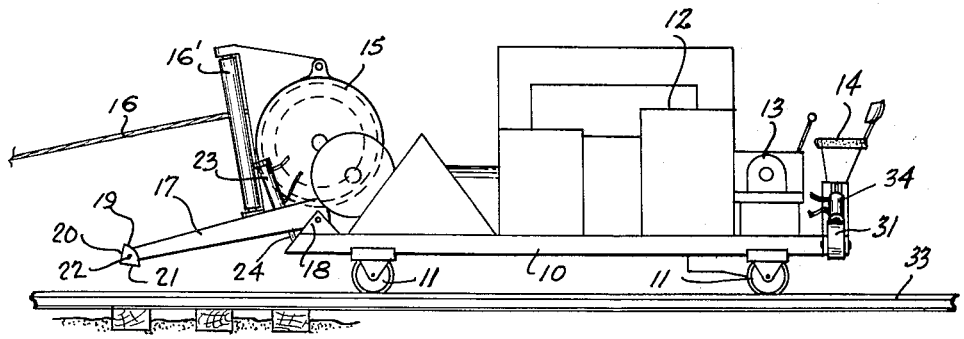
FIGURE 1 is a side view of the device with the movable parts thereof in a first, "travelling" position.

The device consists of a flat truck 10 mounted on rail-engaging wheels 11. A power plant 12 mounted on the truck 10 is employed to drive the wheels 11 through a drive mechanism 13 under the control of an operator who occupies a seat 14.

The power plant 12 is also coupled to drive a conventional winch 15 fitted with a cable 16. The equipment to be drawn along the track, which is not shown in the drawings, will be secured to the remote end of the cable 16 which extends from the winch drum through a fairlead defined by rollers 16'.

Situated at the same end of the truck 10 as the winch 15 are two pairs of forwardly projecting arms 17 pivotally mounted on brackets 18 secured to the truck 10. The projecting, free ends of the arms 17 support a horizontal bar 19 extending transversely across the track between the rails. The bar 19 is formed with two flat faces 20 and 21, and has a limited freedom to pivot about pins 22 securing it to the ends of the arms 17. The arms 17 are raised and lowered between the "travelling" position shown in FIGURE 1 and the "operative" position shown in FIGURES 2 and 3 by a pair of double-acting hydraulic cylinders 23. The bodies of the cylinders 23 are secured to the arms 17 and their piston rods 24 are connected to the truck 10. The cylinders 23 are supplied with pressure fluid from a pump forming part of the power plant 12 and are under the control of the operator.

Figure 2:
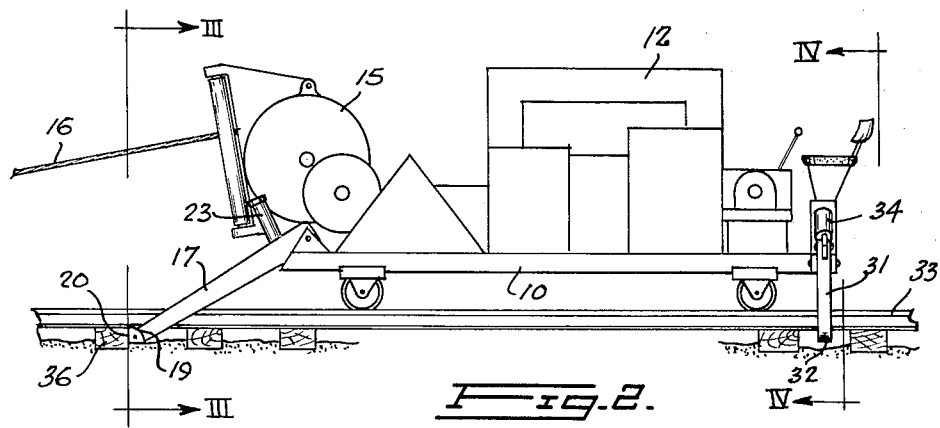
FIGURE 2 is a view similar to FIGURE 1, with the movable parts in a second, "operating" position.
Figures 3, 4:
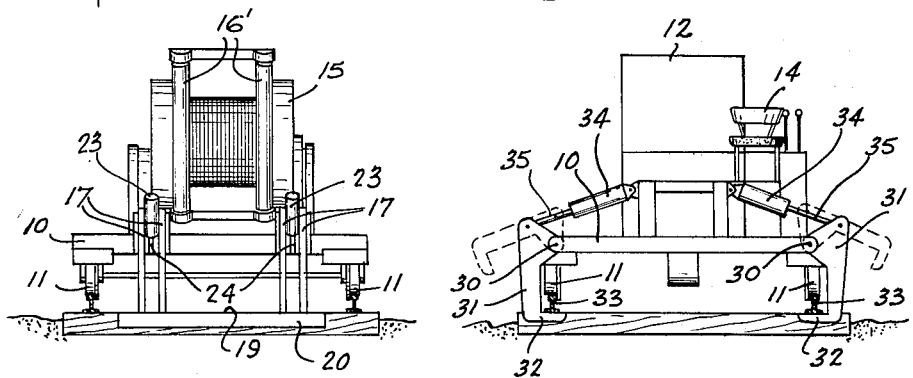
FIGURE 3 is a section on the line III—III in FIGURE 2.
FIGURE 4 is a section on the line IV—IV in FIGURE 2.

At the rear of the device, there are pivotally mounted on the truck 10 by means of pins 30, a pair of hooks 31 having feet 32 adapted to engage beneath the rails 33 of the track as shown in FIGURES 2 and 4. The hooks 31 are movable between the travelling position shown in FIGURE 1 and in broken lines in FIGURE 4, and the operative position shown in FIGURE 2 and in full lines in FIGURE 4, by means of a pair of double-acting hydraulic cylinders 34 having piston rods 35. These cylinders 34 are also under the control of the operator and receive pressure fluid from the power plant.

When the device is to be used to haul another piece of track working equipment along the track, it is driven to the appropriate location with the parts in their travelling positions. The arms 17 are then lowered and the device moved slightly forwardly until the front face 20 of the bar 19 is brought to bear flush against the vertical face of a tie 36, as shown in FIGURE 2. The hooks 31 are then lowered to their operative position and the device is now ready for the winch 15 to haul in on the cable 16 to which the other equipment will be attached. The bar 19 positively anchors the winch 15 against longitudinal travel along the track in the direction in which such travel would be induced by tension in the cable 16, while the hooks 31 prevent the rear of the device being lifted off the track. When the full length of the cable has been hauled in, the device parts are moved to their travelling positions and the device is driven to a new location on the track a cable's length remote where it is re-anchored for another haul.

I claim:

1. A device for pulling a cable for hauling equipment along a railroad track comprising
    (a) a truck including rail-engaging wheels,
    (b) a power plant mounted on said truck,
    (c) a winch mounted on said truck and connected to said power plant for driving thereby, said winch being located for pulling said cable,
    (d) arm means projecting from said truck along the track,
    (e) a horizontal bar mounted on said arm means to extend transversely across the track,
    (f) means mounting said arm means on said truck for movement between a travelling position in which said bar is withdrawn from the track and an operative position in which said bar engages a vertical face of a track tie to anchor the truck against movement in one direction along the track,
    (g) hook means and means mounting said hook means on said truck for movement between a travelling position in which said hook means is withdrawn from hook means engages beneath at least one rail of said track to hold the truck down on the track against lifting forces.

2. A device for hauling equipment along a railroad track comprising
    the track and an operative position in which said
    (a) a truck including rail-engaging wheels,
    (b) a power plant mounted on said truck,
    (c) a winch mounted on said truck and connected to said power plant for driving thereby, said winch being located for hauling in a cable extending forwardly from the truck along the track and connected to said equipment,
    (d) arm means projecting forwardly along the track from the front end of said truck,
    (e) a horizontal bar mounted on the free end of said arm means to extend transversely across the track between the rails,
    (f) power operated means operatively connected to said power plant and mounting said arm means for pivotal movement between a travelling position in which said bar is elevated above said track and an operative position in which said bar engages a vertical face of a track tie to anchor the truck against forward movement along the track induced by tension in said cable, (g) a pair of hooks mounted at the rear end of said truck, (h) and power operated means connected to said power plant for energization thereby and operatively connected with said hooks for pivotal movement thereof between a travelling position in which said hooks are elevated from the track and an operative position in which each hook engages beneath a respective rail of the track to hold the rear end of the truck down on the track against lifting thereof induced by tension in said cable.

No references cited.

ARTHUR L. LA POINT, *Primary Examiner.*